United States Patent Office 3,334,862
Patented Aug. 8, 1967

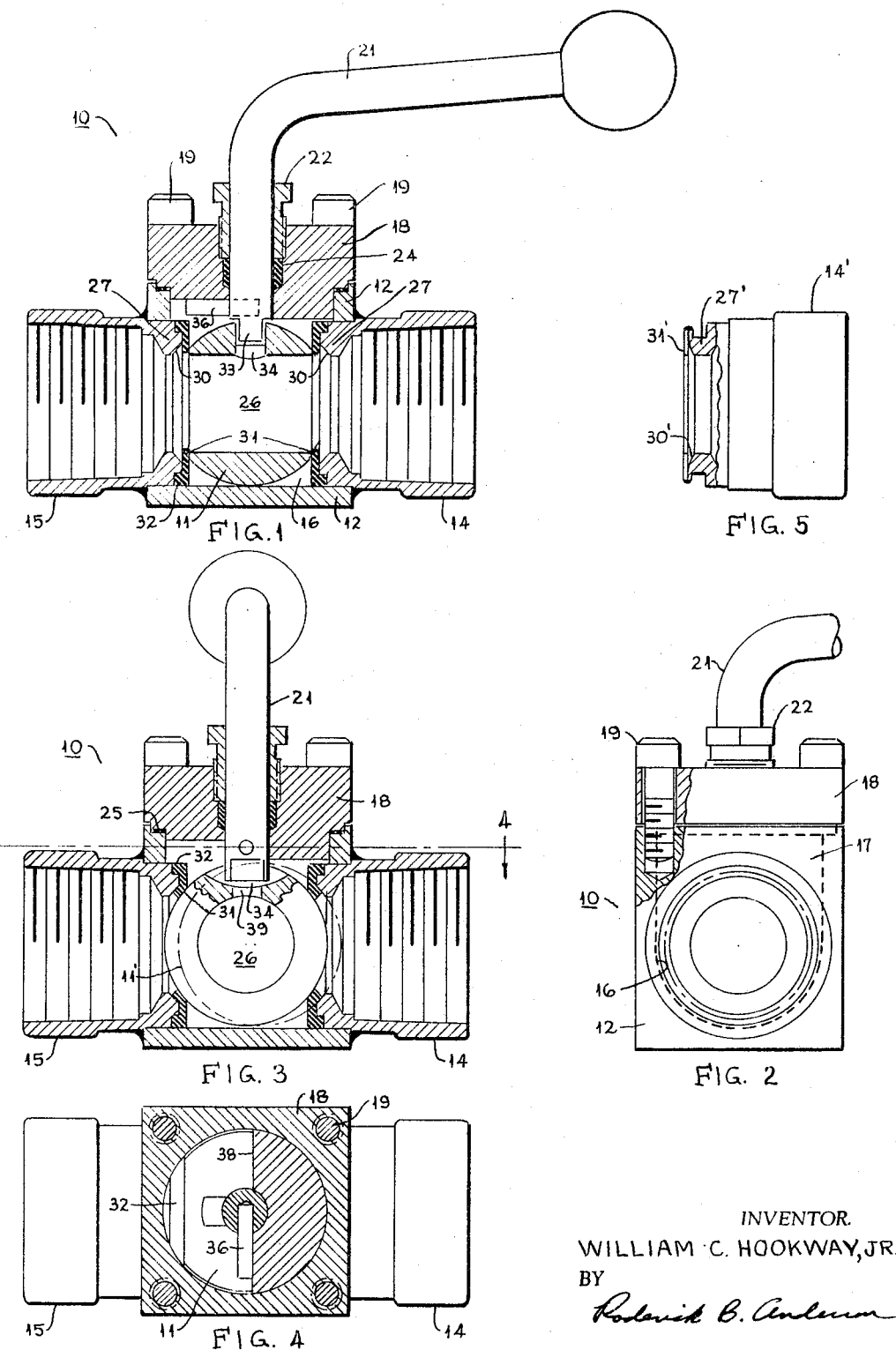

3,334,862
BALL VALVE HAVING RESILIENT SEATS
William C. Hookway, Jr., Morristown, N.J., assignor to Yarway Corporation, Philadelphia, Pa., a corporation of Pennsylvania
Filed Sept. 8, 1964, Ser. No. 394,738
9 Claims. (Cl. 251—288)

This invention relates to ball valves, and more particularly, to ball valves having readily replaceable sealing members.

Ball valves are fairly commonly used for controlling the transmission of various types of fluids through pipes. Such valves typically include a ball having a central passage which is located within a housing that defines part of the fluid transmission channel. When the ball passage is transverse to the fluid channel, the ball blocks fluid transmission, but when the ball is rotated 90 degrees to orient the passage in registration with the channel, fluid flows through the ball freely. Sealing elements are normally compressed against opposite sides of the ball to restrict fluid flow to the central passage when the valve is open and to provide tight closure when the valve is closed.

The ball and sealing elements are normally encased within a rather complicated housing. These housings may be relatively expensive to make, and the valve may be expensive to maintain. The sealing elements are susceptible to wear because they are normally in a stressed state. Replacement of the sealing elements is typically quite difficult because of the inaccessibility of the interior of the housing which contains them. Further, it is sometimes difficult for the operator to determine whether the ball is precisely in an open or closed position, particularly when the sealing elements and other members are slightly worn.

It is an object of this invention to provide ball valves with dependable sealing elements which can be easily replaced.

It is another object of this invention to simplify the construction of ball valves.

It is another object of this invention to provide a ball valve having accurately determinable open and closed positions.

It is still another object of this invention to provide a ball valve which will seal a fluid channel even if the sealing members of the valve are disintegrated, as by fire.

These and other objects of the invention are attained by a ball valve which includes a ball having a central passage which is rotatable between open and closed positions in the general manner described above. In accordance with the invention, the ball is supported in the open position by a main body which defines a cylindrical central channel that is slightly larger in diameter than the ball. Cylindrical end pieces are contained within the main body at opposite ends of the channel. Located between flanges of the end pieces and the ball are two removable flat annular sealing members that are made of a stiff, springy, non-compressible material such as Teflon.

When the ball is in its open position the central apertures of the sealing members surround the central passage of the ball and retain their unstressed flat configuration. When the ball is rotated to a closed position, each of the annular sealing members is deflected and pressed against an angular surface of the flange on the end piece to assume a conical configuration. The pressing of the ball against the annular sealing members during rotation forces the ball into alignment with the central axis of the channel by raising the ball slightly and transferring support of the ball from the bottom surface of the main body to the conically deflected sealing members. When the ball is rotated again to the open position, the sealing members return to their unstressed flat shape. Because of the stiffness of the sealing members, this return to the flat shape is made with an audible snap. Experiment has shown that this snap or audible click gives the operator a dependable indication of the open condition of the valve. Further, this arrangement permits operation of the handle in a choice of two quadrants which facilitates operation of the valve in a restricted space; this advantage would not obtain if a mechanical stop were used for indicating the open position.

The ball and sealing members are accessible through a cylindrical opening in the top of the main body. A removable cover plate encloses the opening during operation. A lower portion of a curved handle extends through a central aperture of the cover plate and engages a rectangular slot on the top of the ball which permits rotation of the ball by the handle. The slot in the ball is elongated to permit axial travel of the ball in the closed position. Therefore, if the seals should disintegrate, as by fire, the ball in the closed position would move axially to abut against the angular surfaces of one of the end piece flanges. These angular surfaces approximately conform to the ball surface to provide an auxiliary sealing seat.

Inserted in the handle adjacent the key portion is a pin which engages the interior surface of the cover plate to prevent the handle from coming out of the cover plate. The interior surface of the cover plate also includes a stepped portion against which the pin abuts when the handle is rotated to the closed position in either of two quadrants. This abutment prevents the handle from being rotated past the closed position and gives the operator an indication that the ball has been rotated to its precise closed position. The pin is inserted into a simple aperture in the handle, but is made longer than the distance between the handle and the main body to prevent it from dropping out into the central channel.

The ball valve which is constructed in accordance with the above principles requires very little complicated machining and is very simple to assemble and to maintain. The seal is dependable and yet readily removable. Both the full open and full closed positions of the ball are readily determinable.

The ball is rotated by a unitary handle which is easily removed and which does not contain linkages that would wear and contribute to the "play" or other orientation imperfections of the handle. Further, the handle can be sealed by a simple packing structure that can be periodically adjusted to compensate for wear of the packing, as will be described later.

These and other objects and features of the invention will be more clearly understood from a consideration of the following detailed description taken in conjunction with the accompanying drawing, in which:

FIG. 1 is a sectional view of an illustrative embodiment of the invention;

FIG. 2 is an end view of the device of FIG. 1;

FIG. 3 is a sectional view of the device of FIG. 1 with the ball rotated to the closed position;

FIG. 4 is a section taken along lines 4—4 of FIG. 3; and

FIG. 5 is a sectional view that illustrates an alternative sealing member.

Referring now to FIGS. 1 and 2 there is shown a ball valve 10 including a ball 11 which is supported in the open position by a main body 12. Secured to the main body are end pieces 14 and 15 which are adapted for threaded engagement with fluid transmission pipes. As shown more clearly on FIG. 2, the main body defines a cylindrical central channel 16 and a cylindrical top opening 17, both slightly larger in diameter than the ball. The opening is enclosed by a cover plate 18 which is removably mounted on the main body by bolts 19 which are preferably hexagonal socket head cap screws. The cover plate 18 has a central aperture in which the lower portion of a handle 21 is rotatably mounted by a gland bushing 22. An annular packing element 24 is compressed by the bushing 22 against the lower portion of the handle and the cover plate 18 to seal the handle. Packing element 24 is preferably made of asbestos or polytetrafluoroethylene, commonly known as Teflon. A gasket 25 seals the cover plate to the main body.

Ball 11 contains a cylindrical passage 26 which permits fluid to flow freely through the valve when it is oriented in the open position shown in FIG. 1. When the ball is rotated 90 degrees with respect to the position shown in FIG. 1, passage 26 is transverse to the central channel 16 and the ball 11 effectively blocks passage of fluid as is illustrated in FIG. 3.

End pieces 14 and 15 contain flanges 27 each having a surface which is perpendicular to the axis of the central channel and a surface 30 which is at an angle with respect to the channel axis. Two annular sealing elements 31 of stiff, springy material such as Teflon are removably positioned between the ball and the flanges. With the ball in the position shown in FIG. 1, the sealing elements assume a flat shape and bear against the edges of the ball which define the central passage 26. The sealing elements preferably include a slight peripheral flange 32 which aids in their initial positioning when the device is assembled or when they are replaced and prevents the rotating ball from displacing the sealing element 31 with respect to the flanges 27.

The handle 21 engages the ball 11 by means of a keyed portion 33 which is in registration with a rectangular slot 34 in the top of the ball. An operator therefore controls the orientation of the ball by rotation of handle 21. Inserted within an aperture in the handle is a pin 36 which bears against the inner surface of cover plate 18. The pin 36 prevents the handle from dropping out of the valve or from being forced out of the valve by the pressure of fluid which may come into contact with it. The pin 36 is held within the handle by friction, but is prevented from dropping out of the handle by the main body 12. The total length of the pin is advantageously longer than the distance between the handle 21 and the main body 12. Hence, the pin will abut against the inner wall of the main body 12 before it disengages completely from the handle and therefore is effectively retained within the handle.

Included in the inner surface of the cover plate 18 is a step portion 38 which is best seen in FIG. 4. This step portion is perpendicular to the axis of the central channel so that when the handle is rotated to a closed position the pin 36 abuts against it. This abutment gives the operator a reliable indication that the ball 11 is oriented in the closed position.

When the ball is rotated to the closed position, as shown in FIG. 3, the annular sealing elements 31 are deflected against angular surfaces 30 to assume a cone shape. It is to be emphasized that the sealing elements are not compressed when the ball is in the closed position; rather, the ball is sealed to prevent leakage by virtue of the elastic forces on the ball by the stressed sealing members 31. Sealing members 31 have a sufficient elasticity such that when the ball is returned to its open position they revert to their flat configurations shown in FIG. 1 with an audible snap or click. I have found that Teflon sealing elements having a thickness of 1/16 inch, an outer diameter of 13/16 inch, and an inner diameter of 7/16 inch, as would be used with ½ inch pipes, have sufficient stiffness and elasticity to revert to a flat configuration with an audible snap. This gives the operator a clear indication that the ball 11 has been oriented in the full open position. It is also to be emphasized that when the ball presses against the sealing elements during rotation to the closed position, it is inherently raised slightly into alignment with the central axis of the channel. This transfers support of the ball from the bottom surface of the main body 12 to the conically deflected sealing members. As a result, a firm seal on the ball is insured, and friction between the ball and the main body is eliminated.

Teflon sealing elements have been found to be particularly desirable because they have the requisite qualities described above and because of their low coefficient of friction which eases the forces required for rotation of the ball. However, if the valve is subjected to high heat or fire, the Teflon sealing elements may disintegrate. This could cause serious trouble if the valve were in the closed position and if fluid were permitted to flow through the channel around the ball. I have found, however, that the angular surfaces 30 of flanges 27 inherently constitute dependable auxiliary seats for sealing the ball in such an event. If, for example, fluid is flowing from left to right, the fluid pressure will force the ball against the angular surfaces 30 as shown in FIG. 3. The rectangular slot 34 in the ball is made longer in the dimension which is transverse to the axis of the passage 26 of the ball in order to permit movement of the ball 11 to the position 11' shown in phantom on FIG. 3. The angular surfaces 30 provide a dependable auxiliary seal because by they approximately conform to the outer surface of the ball.

A ball valve offering the advantages and features described above is easily assembled from simple and easily fabricated structural elements. The main body 11 essentially constitutes a square block having a central cylindrical channel 16 and a cylindrical top opening 17. Likewise, the machining work to be done on the square cover plate 18 is quite simple because the cuts are circular in shape and can be made in a known manner by mounting the cover plate on a jig. The flanges 27 are more easily formed on end pieces 14 and 15 than would be the case if they were a part of an integral housing.

The valve is preferably assembled by first welding the end pieces 14 and 15 to the main body 12. The sealing members 31 are then placed loosely on the end piece flanges without the necessity of subjecting them to any heat which accompanies a weld. Next, the handle is mounted in the cover plate by means of the gland bushing 22 and thereafter pin 36 is inserted into the handle. The ball is then inserted in its open position between the sealing elements, and the cover plate is mounted in place with the key portion 33 of the handle in proper registration with the slot in the ball. The sealing elements 31 are readily replaceable by merely removing the cover plate 18 and removing the ball 11 by inserting a hook through a small hole 39 in the base of the ball slot 34. An L-shaped hexagonal wrench used for tightening bolts 19 can conveniently be used to retrieve the ball. Since the sealing elements are loosely held within the main body they are easily removed and replaced.

The unitary handle 21 is advantageous because it does not require any linkages other than the linkage between the handle and the ball. Conventional ball valve rotating mechanisms require linkages in order to give access to the packing elements that seal it. Packing element 24 is readily accessible because when bushing 22 is loosened and pin 36 removed, the handle removes freely from the cover plate 18. Further, when packing element 24 wears after continued use, it can be forced more snugly against the handle and cover plate by merely tightening gland bushing 22.

FIG. 5 shows an alternative sealing element 31' which is made of thin steel. Element 31' is welded around its periphery to flange 27'. Although this embodiment is slightly more complicated in that it requires an additional welding step, steel sealing elements are generally longer wearing than those of other materials. Element 31' operates in the same manner as described above; it can be deflected to a conical shape and can thereafter revert to an unstressed flat shape with an audible snap.

From the foregoing, it can be appreciated that my invention offers advantages of simplicity of fabrication, assembly, and maintenance. The sealing members including the handle packing are dependable and yet readily removable. Even if the sealing elements 31 should disintegrate, auxiliary sealing means are provided. Friction in turning the ball and inaccuracies due to "play" in the handle are minimized. Finally, both the full open and full closed positions of the ball are readily determinable by the operator as described above.

The embodiment which has been described above has been presented to illustrate the principles of my invention. Various other arrangements may be made by those skilled in the art without departing from the spirit and scope of the invention.

What is claimed is:

1. A ball valve comprising:
   a main body portion defining a substantially cylindrical channel;
   an input end piece mounted on one end of said channel and defining an extension of said channel;
   an output end piece mounted on the other end of said channel and defining another extension;
   a ball contained in said channel and having a cylindrical internal passage;
   said ball being rotatable between an open position wherein its internal passage is parallel with said channel and a closed position wherein its internal passage is transverse to said channel;
   an opening in a top surface of the main body portion;
   a cover removably mounted on said main body for enclosing said opening;
   means for rotating said ball comprising a rotatable handle which extends through said cover;
   means for maintaining the handle within the cover comprising a pin which is removably mounted within said handle, which extends from the handle toward the body portion, which is contiguous with the inner surface of said cover, and which is longer than the distance from the handle to the body portion;
   means for limiting the rotation of said handle comprising a stepped portion on the interior surface of said cover which is adapted to abut against said pin;
   flat annular substantially non-compressible primary seals mounted on said end portions which are contiguous to said ball;
   said primary seals surrounding said internal passage when the ball is in its open position and being deflectable to a cone shape when the ball is rotated to its closed position;
   said primary seals comprising means for physically raising the center of said ball to the center of said channel when the ball is rotated to its closed position;
   said primary seals having sufficient elasticity to revert to an unstressed flat configuration when the ball is rotated to its open position;
   secondary seats being defined by angular flanges on said end pieces against which said seals bear when they are deflected, said secondary seats further comprising means for sealing said ball in the event that said primary seals should disintegrate.

2. A ball valve comprising:
   a main body defining a cylindrical chamber having a central axis;
   end portions attached to opposite sides of said main body which are adapted for engagement with pipes;
   a ball within the chamber having therein a central passage;
   said ball being rotatable to an open position in which the passage is parallel to the axis of the chamber and a closed position in which the passage is transverse to said axis;
   said end portions having flanges contiguous with said chamber;
   each of said flanges having a first flat surface which is transverse to said axis and a second surface which is disposed at an angle with respect to said axis;
   and an annular substantially non-compressive sealing element mounted on the first surface of each end portion;
   said sealing elements having a flat unstressed configuration and surrounding said central passage when the ball is in its open position, and being deflectable to a stressed cone-shaped configuration when the ball is rotated to its closed position;
   said seals comprising means for physically raising the center of said ball to the center of said cylindrical chamber when the ball is rotated to its closed position;
   said sealing elements having sufficient elasticity to revert to an unstressed flat configuration when the ball is rotated to its open position.

3. The ball valve of claim 2 wherein;
   said main body includes a cylindrical inner surface which supports said ball in the open position and a top surface which contains an opening; and further comprising:
   a cover plate removably mounted over said opening;
   and a rotatable handle extending through said cover plate in operative engagement with the said ball.

4. The ball valve of claim 2 wherein the sealing elements are made of Teflon, whereby the sealing elements revert to a flat configuration, when the ball is rotated to an open position, with an audible snap.

5. The ball valve of claim 2 wherein the sealing elements are made of thin steel, whereby the sealing elements revert to a flat configuration, when the ball is rotated to an open position, with an audible snap.

6. A ball valve comprising:
   a main body defining a cylindrical chamber having a central axis;
   end portions attached to opposite sides of said main body which are adapted for engagement with pipes;
   a ball within the chamber having therein a central passage;
   said ball being rotatable to an open position in which the passage is parallel to the axis of the chamber and a closed position in which the passage is transverse to said axis;
   said end portions having flanges contiguous with said chamber;
   each of said flanges having a first flat surface which is transverse to said axis and a second surface which is disposed at an angle with respect to said axis;
   and an annular substantially non-compressive sealing element mounted on the first surface of each end portion;
   said sealing elements being contiguous with said ball when the ball is in the open position;
   said sealing elements bearing against the ball and against the second surface of the end portions when the ball is in the closed position;
   said main body including a cylindrical inner surface which supports said ball in the open position and a top surface which contains an opening;
   a cover plate removably mounted over said opening;
   a rotatable handle extending through said cover plate in operative engagement with said ball;
   said cover plate having a first interior surface which faces said ball and a second interior surface which is displaced from the first interior surface in the direction of the ball;
   a step position interconnecting the first and second surfaces;
   and means for preventing the handle from falling out of the cover plate and for limiting the angular rotation of the handle comprising a pin extending from said handle which is contiguous with the first surface and which is adapted to abut against said step.
7. The ball valve of claim 6 wherein:
the pin is removably mounted in an aperture in the handle;
and the pin is longer than the distance from the handle to the main body portion, thereby preventing the pin from dropping out of the aperture.
8. The ball valve of claim 7 further comprising:
means for mounting the handle in the cover plate comprising a threaded bushing;
means for sealing the handle in the cover plate comprising packing material which bears on the handle, cover plate, and a lower surface of the bushing;
said bushing further comprising means for adjustably forcing said packing material against said handle and cover plate.
9. The ball valve of claim 8 wherein:
the handle comprises a single rod-like element which is curved at approximately a right angle to provide leverage for convenient manual rotation.

References Cited

UNITED STATES PATENTS

| | | | |
|---|---|---|---|
| 2,297,161 | 9/1942 | Newton | 251—315 |
| 2,890,856 | 6/1959 | Clade | 251—174 |
| 3,056,576 | 10/1962 | Kulisek | 251—315 |
| 3,195,560 | 7/1965 | Pofit | 251—315 X |

FOREIGN PATENTS 581,462   8/1958   Italy.

WILLIAM F. O'DEA, *Primary Examiner.*

HAROLD W. WEAKLEY, *Examiner.*